(12) United States Patent
Stanik et al.

(10) Patent No.: US 8,800,125 B2
(45) Date of Patent: Aug. 12, 2014

(54) MACHINE TOOL

(75) Inventors: Markus Stanik, Albershausen (DE); Hans-Joachim Stumpp, Salach (DE)

(73) Assignee: MAG IAS GmbH, Goppingen (DE)

( * ) Notice: Subject to any disclaimer, the term of this patent is extended or adjusted under 35 U.S.C. 154(b) by 672 days.

(21) Appl. No.: 12/930,806

(22) Filed: Jan. 18, 2011

(65) Prior Publication Data

US 2011/0173788 A1    Jul. 21, 2011

(30) Foreign Application Priority Data

Jan. 19, 2010    (DE) .................. 10 2010 005 006

(51) Int. Cl.
| | | |
|---|---|---|
| *B23P 23/04* | (2006.01) | |
| *B23B 11/00* | (2006.01) | |
| *B23B 3/16* | (2006.01) | |
| *B23B 23/00* | (2006.01) | |
| *B23Q 39/02* | (2006.01) | |
| *B23Q 1/01* | (2006.01) | |
| *B23Q 11/08* | (2006.01) | |
| *B21H 1/00* | (2006.01) | |
| *B21H 3/04* | (2006.01) | |
| *B21H 5/02* | (2006.01) | |

(52) U.S. Cl.
CPC ............. *B23P 23/04* (2013.01); *B23B 11/00* (2013.01); *B23B 3/162* (2013.01); *B23B 23/005* (2013.01); *B23Q 39/02* (2013.01); *B23Q 39/021* (2013.01); *B23Q 1/017* (2013.01); *B23Q 11/08* (2013.01); *B21H 1/00* (2013.01); *B21H 3/042* (2013.01); *B21H 5/02* (2013.01)

USPC .................. 29/27 C; 72/70; 72/203; 82/121; 82/148; 29/41

(58) Field of Classification Search
CPC .......... B23B 11/00; B23P 23/04; B23P 23/00
USPC ............. 29/27 R, 27 C, 41; 82/129, 120, 121, 82/148; 72/70, 203
See application file for complete search history.

(56) References Cited

U.S. PATENT DOCUMENTS

| | | | |
|---|---|---|---|
| 632,358 | A * | 9/1899 | Miller ............................. 72/108 |
| 2,219,694 | A * | 10/1940 | Miller ............................ 29/37 R |
| 3,282,080 | A * | 11/1966 | Taylor ........................... 29/27 R |
| 4,922,739 | A * | 5/1990 | Ostertag ........................... 72/80 |
| 4,949,444 | A * | 8/1990 | Kojima et al. ................ 29/27 R |
| 5,885,199 | A * | 3/1999 | Shao .............................. 29/27 C |
| 2009/0106961 | A1* | 4/2009 | Tomioka et al. ............. 29/90.01 |
| 2010/0113172 | A1* | 5/2010 | Braun ............................. 470/57 |
| 2012/0186320 | A1* | 7/2012 | Meidar et al. .................. 72/324 |

FOREIGN PATENT DOCUMENTS

| | | | |
|---|---|---|---|
| DE | 3929005 | A1 * | 3/1991 |
| DE | 102007044283 | A1 | 3/2009 |
| GB | 1321630 | A * | 6/1973 |
| JP | 05-261602 | A * | 10/1993 |
| WO | 2007137762 | A1 | 12/2007 |

* cited by examiner

*Primary Examiner* — Erica E Cadugan
(74) *Attorney, Agent, or Firm* — Head, Johnson & Kachigian, P.C.

(57) ABSTRACT

In order to save the investment for a separate cold rolling machine for applying threads etc. a cold rolling unit is placed in a moveable manner onto the Z-drives of a turning machine wherein the cold rolling unit can be configured much larger and much more stable and with less wear than a cold rolling unit used in a tool revolver. Even parallel processing through turning and rolling is facilitated.

11 Claims, 11 Drawing Sheets

Machine tool Including a Proprietary Tail Stock or an Opposite Spindle that is Located on an Opposite side of the Bed from the Work Piece Spindle, Wherein the Forming Roller Units Can Be Moved Along the Base Element and Can Be Moved Apart Far Enough in the X Direction Away from the Rotation Axis of the Work Piece, So That The Forming Roller Units Can be moved in the direction of the Z-axis Beyond a Forward Free End, Which is Configured to Engage the Work Piece, of the Tail Stock Center or of the Opposite Spindle of the Machine Tool

Fig. 5

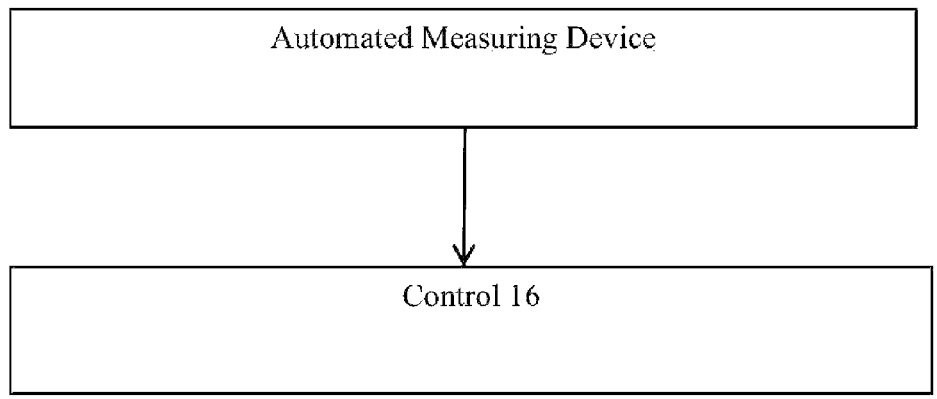

Fig. 6

MACHINE TOOL

I. FIELD OF THE INVENTION

The invention relates to a material removing machine tool including an additional cold rolling module, wherein a workpiece is driven in the machine tool in rotation during processing e.g. through turning or through turning and milling.

II. BACKGROUND OF THE INVENTION

For the purpose of clarity, only "turning machines" are subsequently described.

Turning machines for the purposes of the present patent application are also interpreted to also be all turning-machine derivatives. Thus, e.g., combined turning and milling machines and combined turning and broaching machines, thus any machine in which a workpiece is driven in rotation by a spindle, and tool units like, e.g. turning tools, milling tools, broaching tools or grinding tools are movable along the rotation axis of the workpiece and also transversal thereto and that are configured to process the workpiece.

Turning machines are typically used for fabricating workpieces that are typically rotation symmetrical or at least partially rotation symmetrical through clamping the workpiece, e.g., in a chuck, and driving it in rotation through a head stock, and causing a material removal at the rotating workpiece through engaging tools, like, e.g., stationary tools (turning) or rotating tools (side mills, end mills or disc shaped broaching tools) or tools that are moved tangentially in a straight line (broaching tools).

The tool units are thus movable in a Z-direction, the rotation direction of the workpiece and are additionally movable in at least one of the transversal directions (X- and Y-direction).

In turning machines, the turning tools are typically disposed in a larger quantity on a pivotable revolving disc, and the tool revolving disc is at least movable in X-direction and in Z-direction.

Typically, two revolvers of this type are disposed on opposite sides of a rotation axis.

For different machine concepts, the rotation axis of the workpiece can be arranged in a horizontal or vertical direction.

Additionally also, cold rolling is known in order to press teethings, threads, annular grooves, knurling, oil grooves or other contours onto the workpiece circumference through a cold forming process through pressing accordingly contoured rollers or bars against the circumference of the rotating workpiece.

Since significant contact forces against the workpiece are required for this purpose, such cold rolling is typically performed in a separate cold rolling machine when larger numbers of workpieces shall be processed.

It is furthermore also known to use a cold rolling unit in a turning machine by inserting the much smaller cold rolling unit, which typically has two forming rollers, in a tool receiver of a tool revolver of the turning machine.

On the one hand, the press forces applicable to the workpiece are certainly much smaller as a function of the maximum load bearing capability of the tool receiver and of the tool revolver including its guides.

This certainly limits the size, in particular the depth of the embossings on the workpiece, which are producible as a function of the work piece material.

On the other hand, this also causes relatively quick wear of the forming rollers, which are very small due to their mounting location, so that they are only usable to process small batches, but no large batches.

Another disadvantage of this solution is that the dimensional precision of the profiles that are producible at the workpiece is not optimal due to the many disengageable connections, thus supports and similar, that are provided between the forming rollers and the bed of the machine.

Between these two extremes, thus a separate cold rolling machine on one hand, and a cold rolling unit with very limited utility in a tool receiver of a turning machine revolver on the other hand, however, there is a wide gap for solutions for the problems, which exist in the majority of practical applications.

III. DESCRIPTION OF THE INVENTION a) Technical Object

Thus, it is an object of the invention to provide a machine and a method, which is overcome the disadvantages of the prior art, and which in particular can perform as many cold rolling tasks at a rotation symmetrical workpiece as possible without necessitating an investment into a separate cold rolling machine and without the technical restrictions of a cold rolling module in a tool revolver of a turning machine.

b) Solution

The object is achieved through the features of the present invention.

A machine tool according to the invention includes a cold rolling unit which is arranged separate from the material removing tools and their tool receivers, thus which is not an element of these tool units, and which can be driven to the workpiece supported in the spindle chuck of the machine tool as required, in particular on the same supports that are also being used by the material removing tool units, e.g., the Z-supports.

This way, the cold rolling unit can be used as an additional module, and can be retrofitted at any suitable machine tool of this type with low complexity for the retrofit, since essential components of the machine tool, like spindle, chuck and C-guides, are also used by the cold rolling unit.

However, since, the cold rolling unit is not a component of the material removing tool units, but can be moved and operated independently there from, the cold rolling unit is not limited by the geometries of the tool receiver of the material removing tool units. The force flow does not go, e.g. through the pivot axis of the tool revolver and the tool receivers, but goes from the control unit directly into the guides used, e.g., Z-guides, into the bed of the machine.

This achieves high stability for the cold rolling unit which can thus apply much higher forces than a cold rolling unit received in the tool revolver.

Thus, also larger forming rollers with less wear can be used, so that a cold rolling unit according to the invention can also cause a high amount of surface forming at the workpiece, and can do this with a large number up to the wear limit of the forming rollers, which facilitates performing a large percentage of all cold rolling jobs on rotation symmetrical workpieces, without having to invest into a separate cold rolling machine, which is much more expensive than the incremental cost of a machine tool configured according to the invention.

In order not to impede the material removing processing of the workpiece, the cold rolling unit is typically disposed on a side of the material removing tool units, wherein the side faces away from the spindle, and can thus be completely removed from the longitudinal portion of the workpiece supported in the chuck.

For this purpose, the forming roller unit also includes a closable cover, in particular in a direction towards the spindle, thus the material removing tool units, in order to prevent that shavings penetrate the cold rolling unit during material removing processing, since the Z-supports on which the cold rolling unit moves typically extend over the entire operating range and in particular axially beyond the operating range.

The configuration of the cold rolling unit typically includes a base element, which is movable along the bed e.g. on the Z-supports of the machine, wherein the base element primarily extends in a transversal direction relative to the rotation axis of the machine tool, so that two or more forming roller units are movable along the base element, wherein the forming roller units are disposed about the turning center, and in particular are moved by hydraulic cylinders in order to apply the high forces during cold rolling.

The base element preferably includes a C-shaped base element, wherein the center arm of the C-shape runs on supports, and the ends of the free arms oriented away from the support are secured through a demountable pull rod against being pressed apart by the cold rolling forces, which creates a circumferentially closed support element in which the forming roller units are received.

Besides the forming roller, the forming roller units respectively include a separate drive motor associated with each forming roller and a synchronization of the two drive motors, which is typically operated electrically.

Furthermore, the forming roller unit includes a tailstock center, which can be moved in a direction of the turning axis along the base element of the cold rolling unit in order to support the freely protruding end of the workpiece in transversal direction during the cold rolling process. Preferably, the tailstock center can be moved axially, so that it can support the face of the workpiece, also in a processing step where material is removed.

Alternatively, the machine tool can also include a proper tailstock center or an opposite spindle, so that the cold rolling unit is then disposed between the main spindle on one side and the tailstock support or the opposite spindle on the other side during cold rolling.

Then, however, it is necessary that the tailstock support center is movable in between the forming roller units for processing through rolling, and it is necessary for using the opposite spindle or the tailstock support during material removing processing, to be able to move the two forming roller units far enough apart from one another, so that they can be moved in Z-direction beyond the front free end of the tailstock support or the chuck of the opposite spindle.

Additionally, a machine tool according to the invention preferably includes a control, which does not only control the cold rolling unit, but the entire machine tool including the cold rolling unit.

As a consequence, the machine tool has to receive the signals with respect to speed and also angular position of the forming roller drives, and thus of the workpiece from the cold rolling unit, and has to process the signals further, and in case a material removing processing is simultaneously performed at another location at the workpiece, the machine tool then has to use the information also for controlling material removing processing.

When the machine tool includes an automatic measuring unit, the control can use the measurement values of the workpiece before cold rolling, e.g. the current diameter, in order to exactly adjust the forming roller units as a function of the measured values, which improves the quality, in particular the dimensional precision, of the formed surface. Otherwise, the forming rolling units have to be corrected manually from time to time.

Thus, it is possible with a machine of this type to roll a surface structure onto an exterior circumferential surface of the at least partial rotation symmetrical workpiece, and to also perform a material removal on the same machine tool.

The two processing steps can be performed one after the other.

In this case, the workpiece is driven by the workpiece spindle of the machine tool for material removing processing, and driven by the forming rollers for processing through cold rolling.

Both processing steps, however, can also be performed at the workpiece simultaneously at different Z-positions, wherein the workpiece is then driven by the forming roller drives, and the control of the machine tool receives the speed information with respect to the workpiece also from the forming roller drives.

The rotation drive of the machine tool spindle in whose chuck the workpiece is supported during material removing processing and also during cold rolling is either switched to run freewheeling during cold rolling, no matter whether additional material removal is performed at the workpiece or not, or it is switched to drive speed, which is synchronized with the driving for the workpiece, which primarily comes from the forming rollers.

The cold rolling process is performed, so that initially the machine tool spindle is switched to freewheeling or to synchronous operation with the forming roller drives and the tailstock center either of the cold rolling unit or of a separate tailstock of the machine tool, or also an opposite spindle provided at the machine tool and its clamping chuck, is engaged at the freely extending end of the workpiece.

Typically, the forming roller drives are only started subsequently, and moved against the workpiece in a transversal direction until they come into operative engagement with the workpiece and press the intended surface structure into the circumferential surface of the workpiece through the contact force against the workpiece under continuous roll off.

c) Embodiments

Embodiments of the invention are subsequently described with reference to drawing figures, wherein.

Figure 1A:
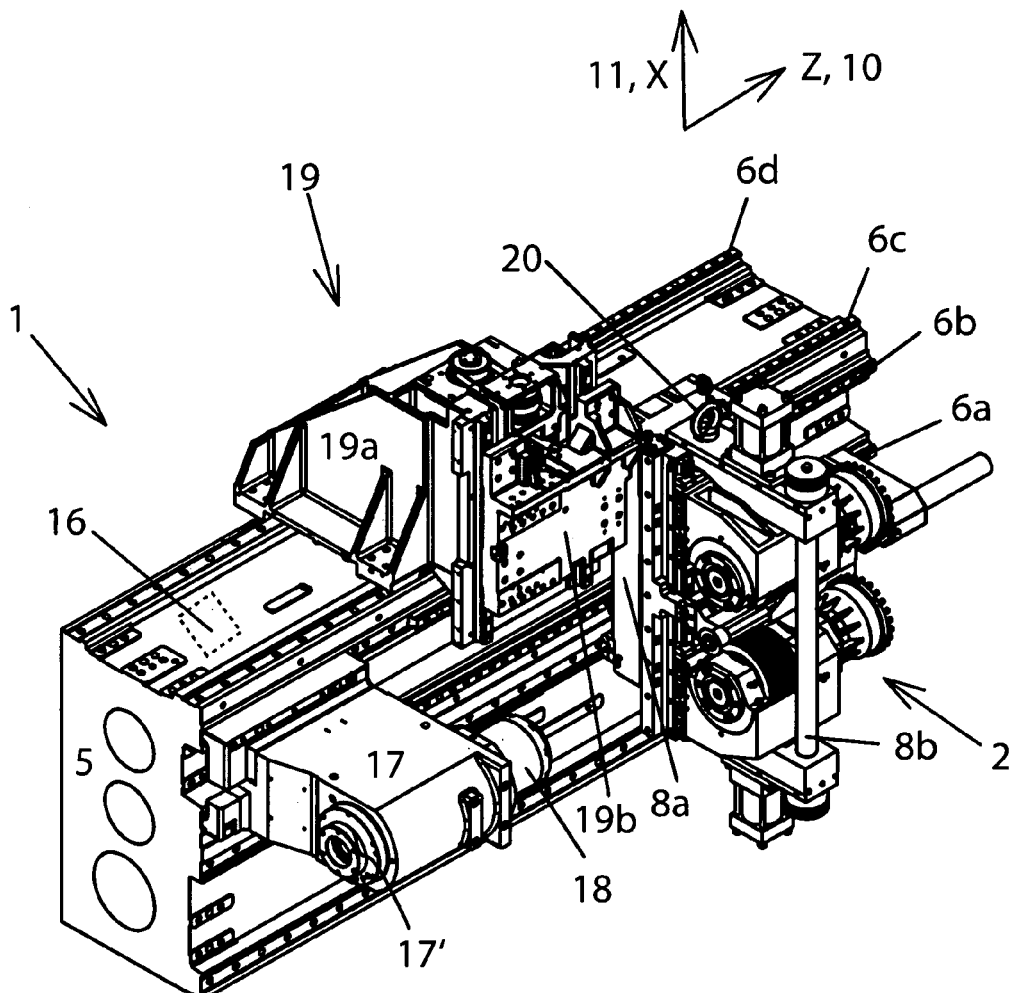
FIG. 1 illustrates a machine tool according to the invention.
Figure 1B:
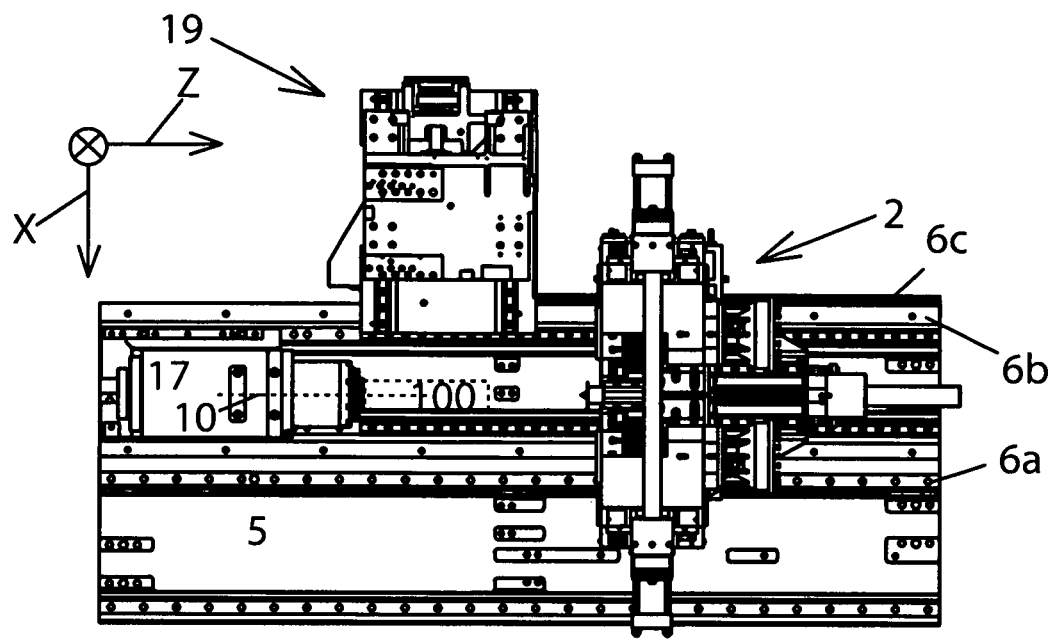
Figure 1C:
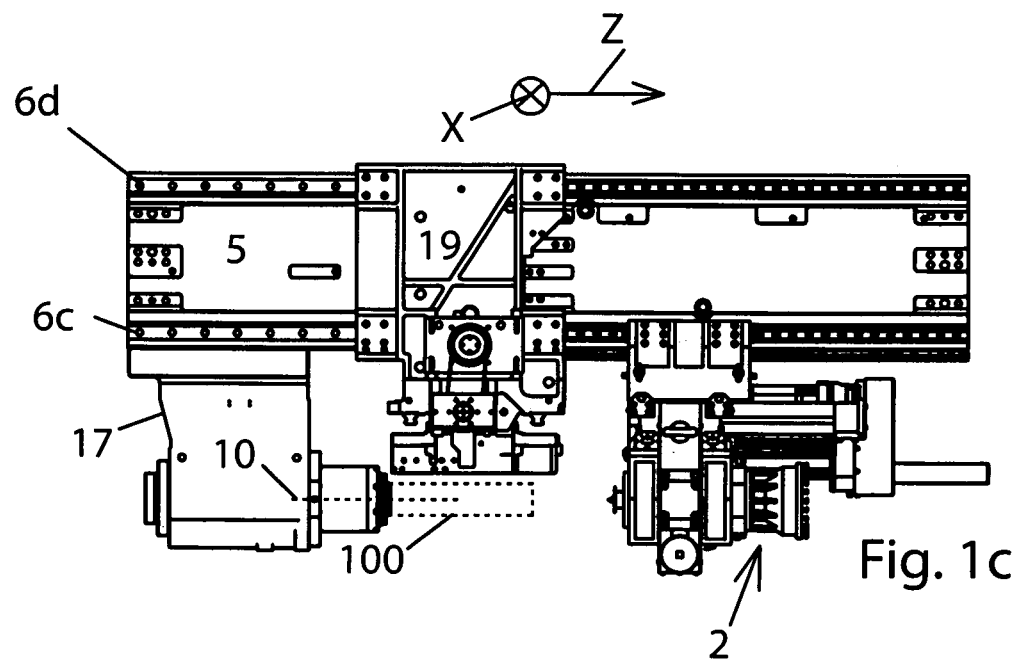
Figure 1D:
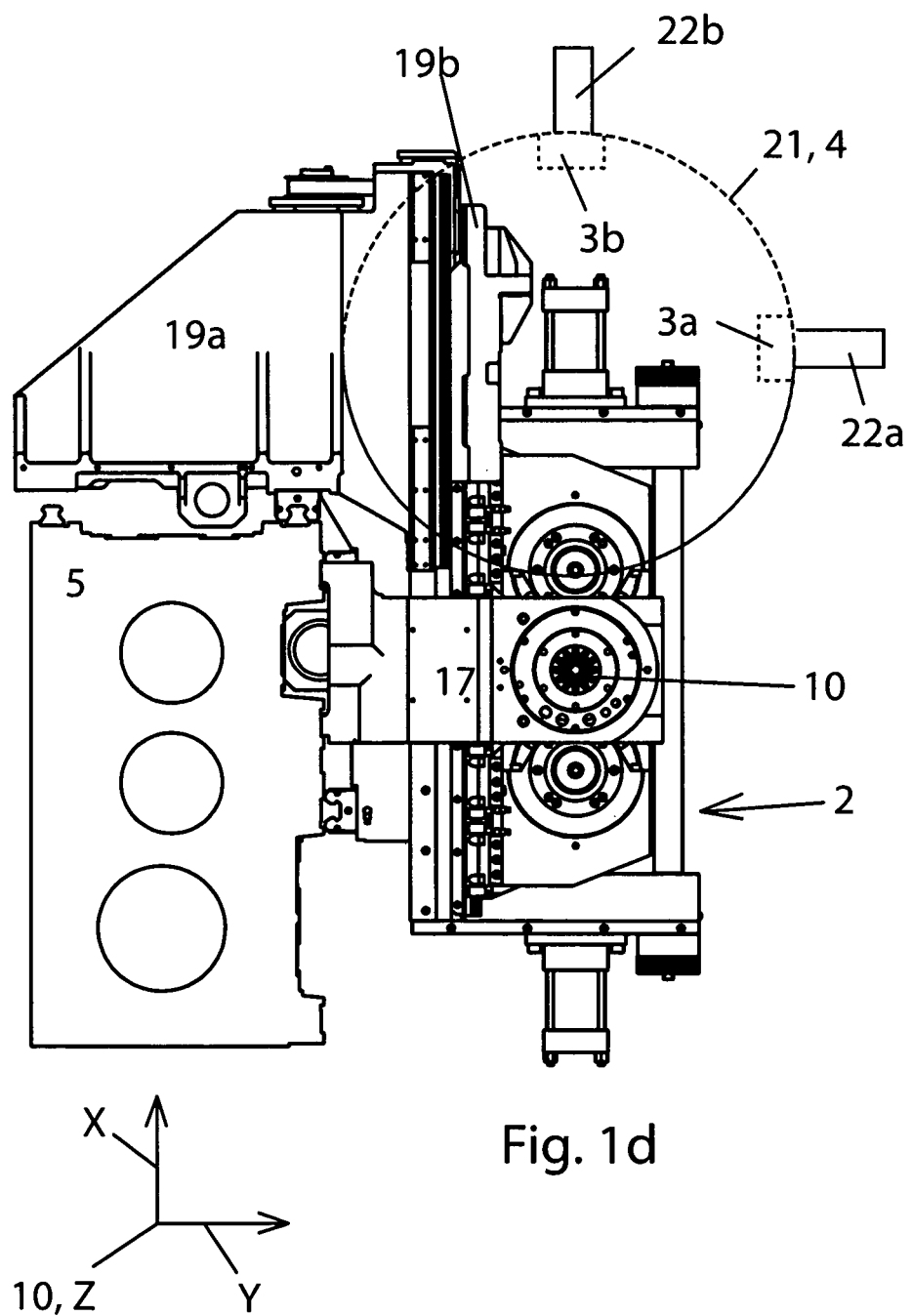

The FIG. 1 illustrated the machine tool 1 according to the invention in a perspective view in FIG. 1a, in a frontal view in FIG. 1b, in a top view in FIG. 1c, and in a view in the direction of the rotation axis 10 in FIG. 1d.

Thus, for purposes of clarity, all fairings are omitted at the machine tool.

The machine bed 5 is configured approximately rectangular in cross section, and standing upright with Z-guides 6a, b on the front side, and also with Z-guides 6c, d on the top side.

The headstock 17 is supported fixated or movable in Z-direction at the front surface of the bed 5 in the left portion of the figures and protrudes in forward direction.

A tool spindle 17' is rotatably supported in the headstock 17, wherein the tool spindle includes a chuck 18 for clamping and supporting a workpiece 100 at the free end of the tool spindle oriented towards the operating portion, wherein the workpiece is only schematically indicated in FIG. 1b.

The tool support 19 runs on the Z-guides 6c and 6d of the top of the bed 5 and also on the most forward guide 6b of the top side of the bed 5, wherein the tool support is made from a Z-slide 19a running on the recited guides and made from a X-slide 19b which is supported at the front surface of the Z-slide 19a, so that it is moveable transversal to the rotation axis and carries a tool unit 4 in practical applications, e.g. a tool revolver 21 as it is indicated only in FIG. 1d with only two tools 22a, b which are disposed in its tool receivers 3a, b.

In practical applications an additional tool support with a Z-slide and an X-slide and a tool revolver is often arranged below the turning center 10 at the front surface of the bed 5, wherein the tool support is not illustrated either for reasons of clarity.

According to the invention it is essential in FIG. 1 that the cold rolling unit 2 illustrated at the right half of the bed also uses the Z-guides 6a, b on the front side of the bed 5 and the forward Z-guide 6c on the top side of the bed 5 and is arranged on the side opposite to the tool support 19 with respect to the spindle 17'.

Thus, the cold rolling unit 2 can be moved in C-direction to the work piece 100 supported in the clamping chuck 18 and can be moved away from the work piece, wherein the tool support 19 preferably cannot only be moved in Z-direction to the head stock 17, but also beyond the head stock in order not to impede the cold rolling operation.

Thus, the forward freely extending end of the work piece 100 can be moved into the cold rolling unit 2 and can be formed therein through cold rolling.

In the illustrations according to FIG. 1 furthermore the covers are omitted at the cold rolling unit 2, which are at this location in practical applications as illustrated in FIG. 4.

Figure 4A:
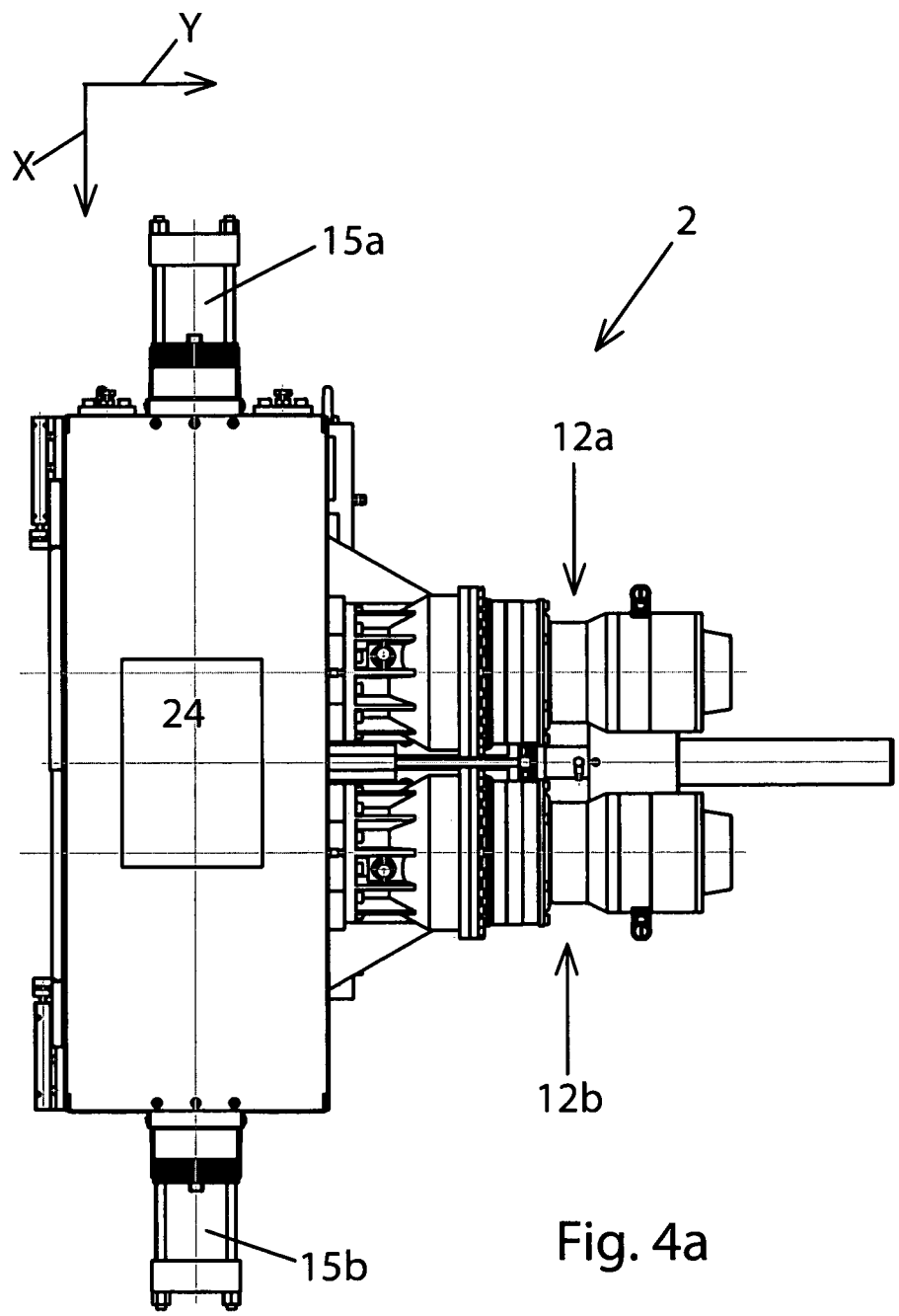
FIG. 4 illustrates the cold rolling unit with a protective cover.
Figure 4B:
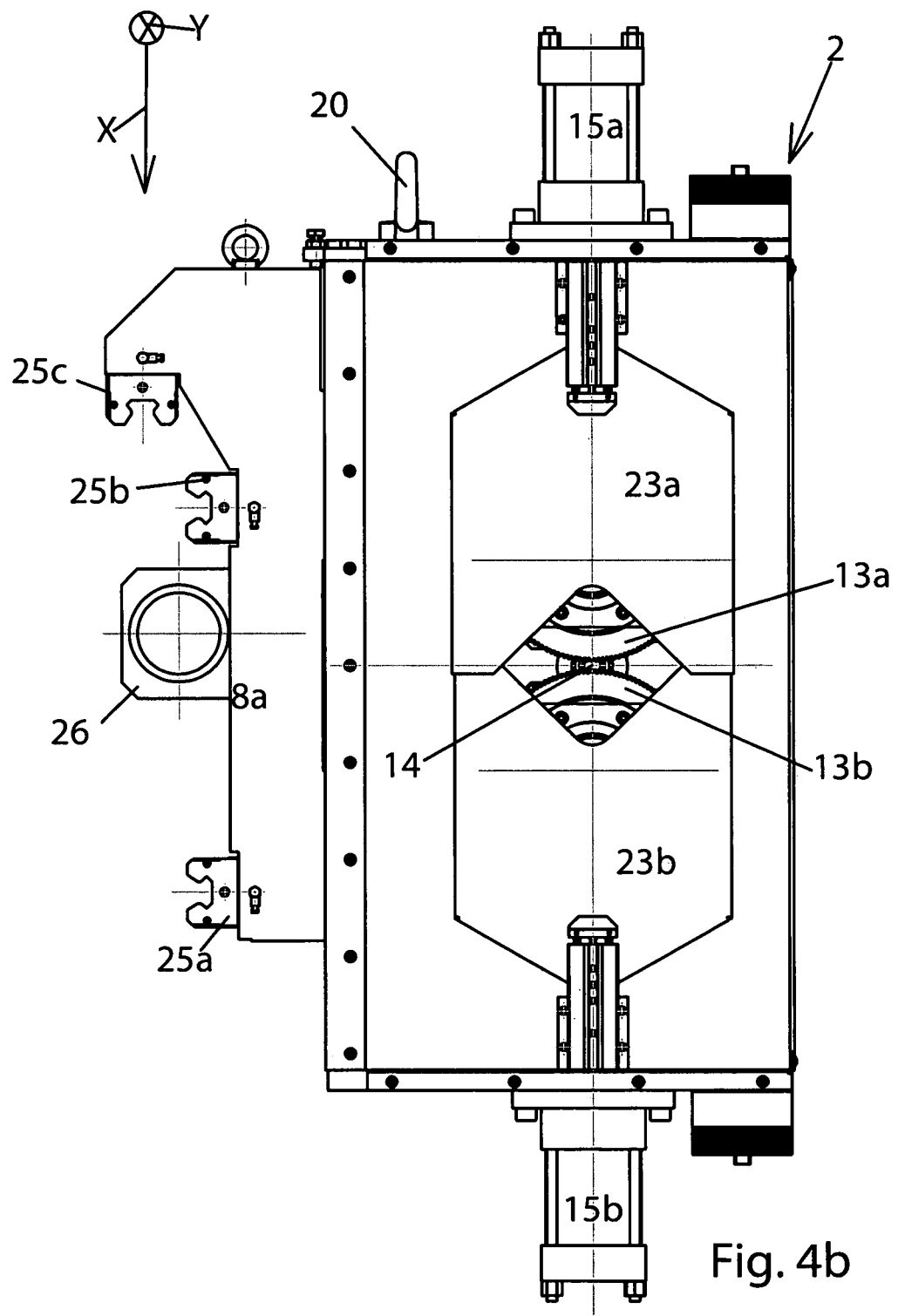

In FIG. 4b which illustrates the cold rolling unit 2 in the same viewing direction as FIG. 1d it is evident that the face of the cold rolling unit 2 in this viewing direction can be largely or also completely closed by two covers 23a, b which are moveable relative to one another like apertures, so that chips which are generated during material removing processing are prevented from falling into the cold rolling unit 2 and in particular between the forming rollers 13a, b.

For the same reason also the front face of the cold rolling unit 2 which is visible in the front view of the machine according to FIG. 4a is completely closed besides a moveable cover 24 which can also be configured transparent in the center portion, wherein the cover is configured to be opened in order to monitor the wear at the forming rollers 13a, b and similar, or to also monitor the cold rolling process directly during operations.

Figure 2A:
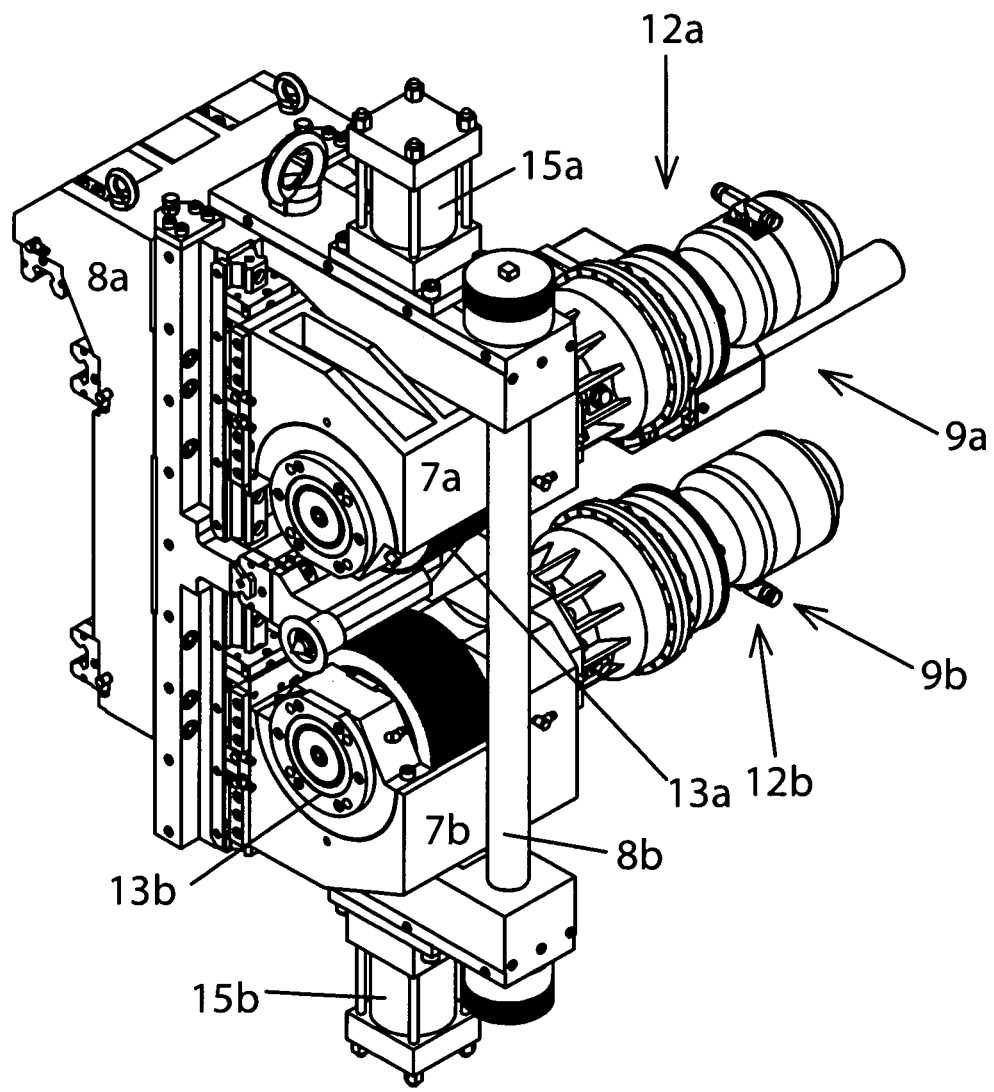
FIG. 2 illustrates the cold rolling unit.
Figure 2B:
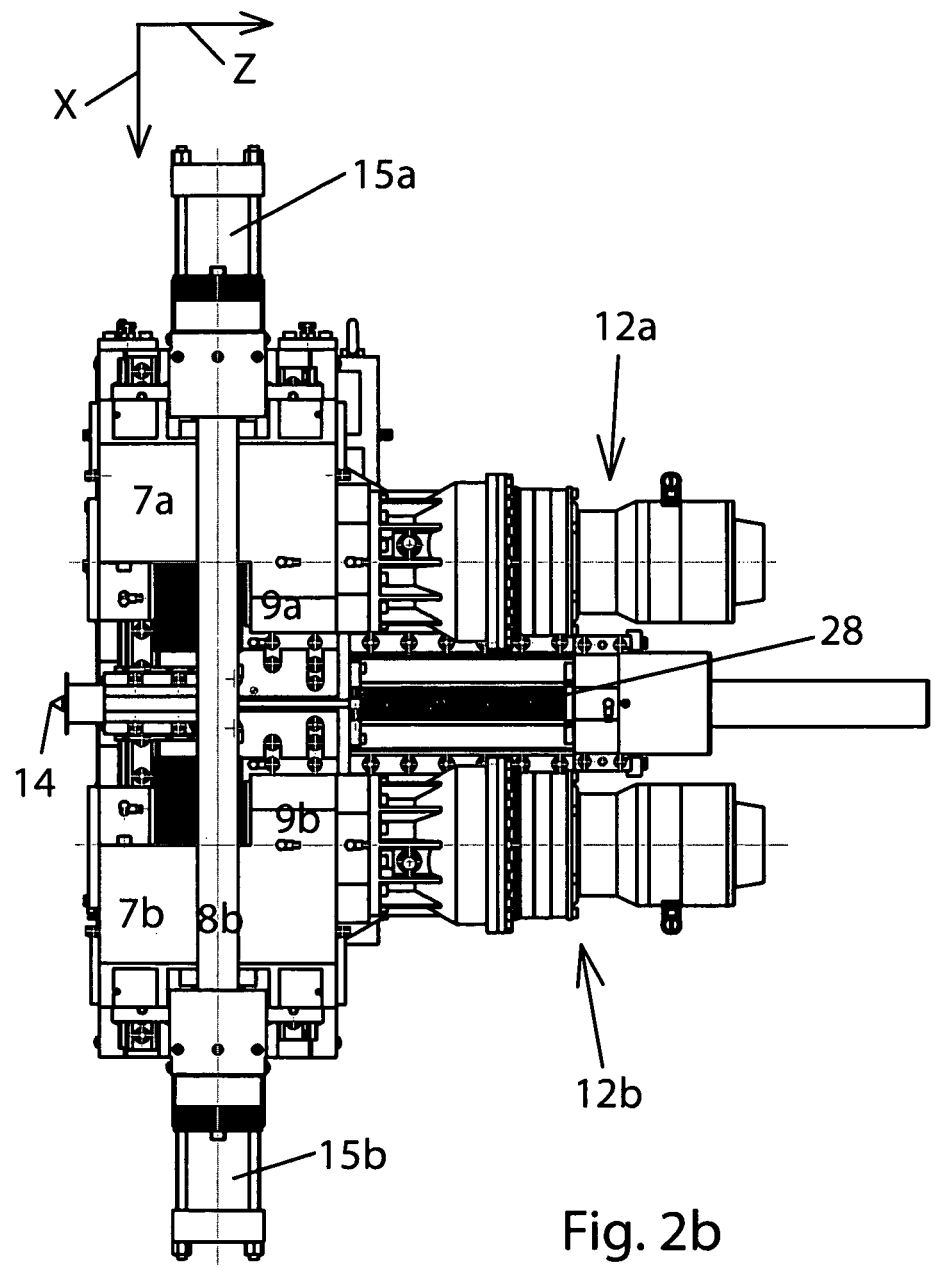
Figure 2C:
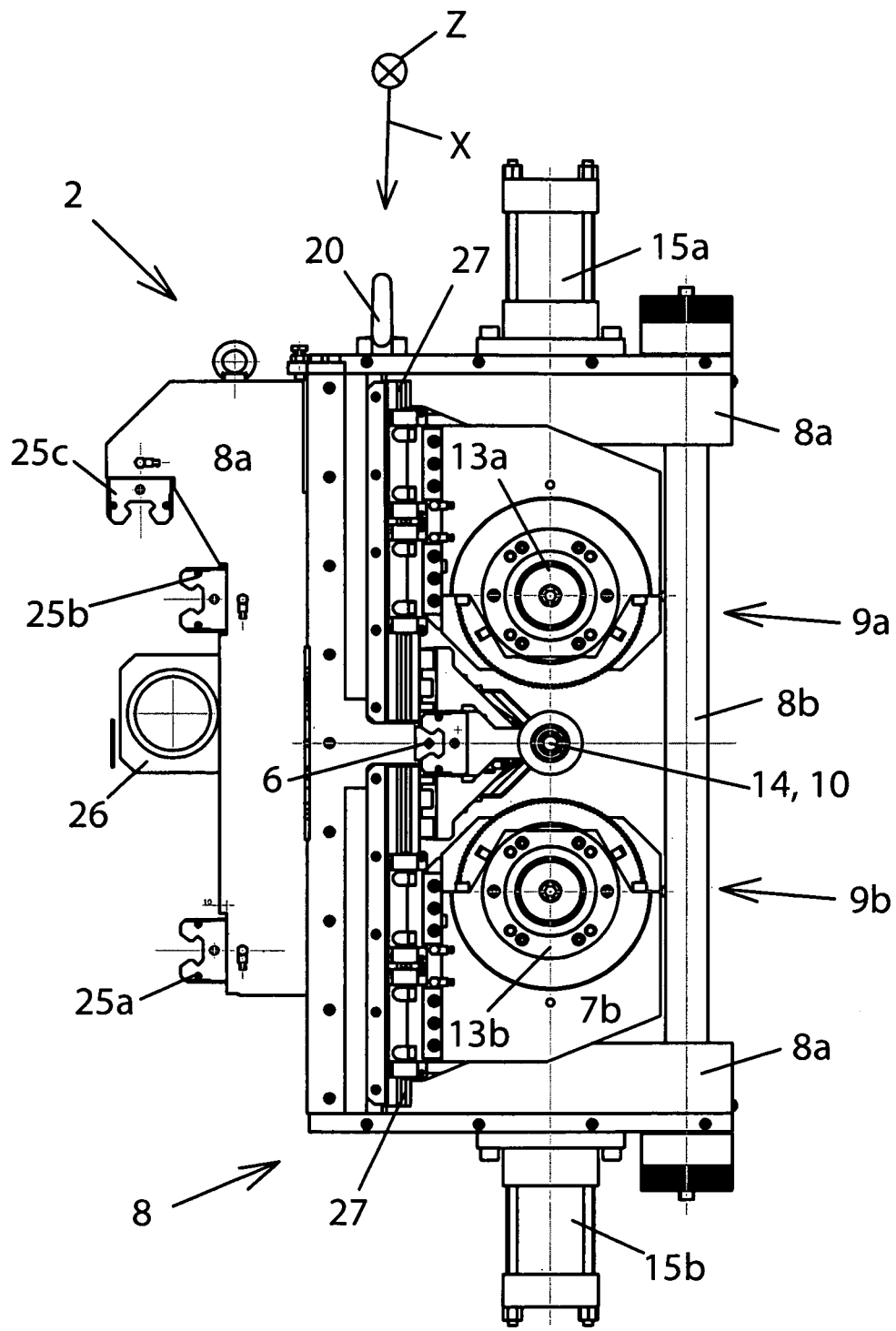
Figure 2D:
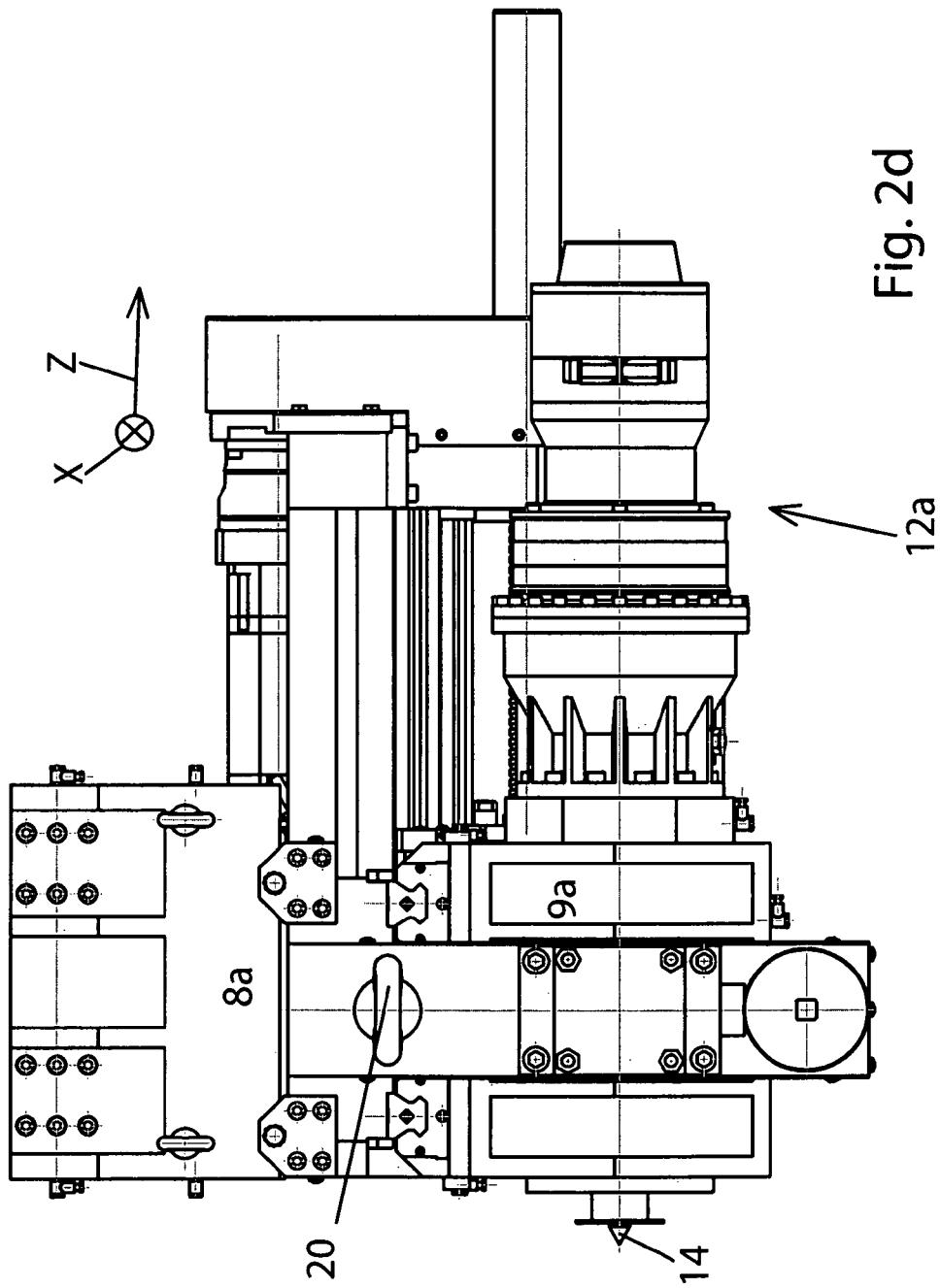

FIG. 2 illustrate the cold rolling unit 2 without fairings in a perspective view (FIG. 2a), in a front view transversal to a rotation axis (FIG. 2b), in a view in the direction of the rotation axis (FIG. 2c) and in a top view in (FIG. 2d).

Figure 3:
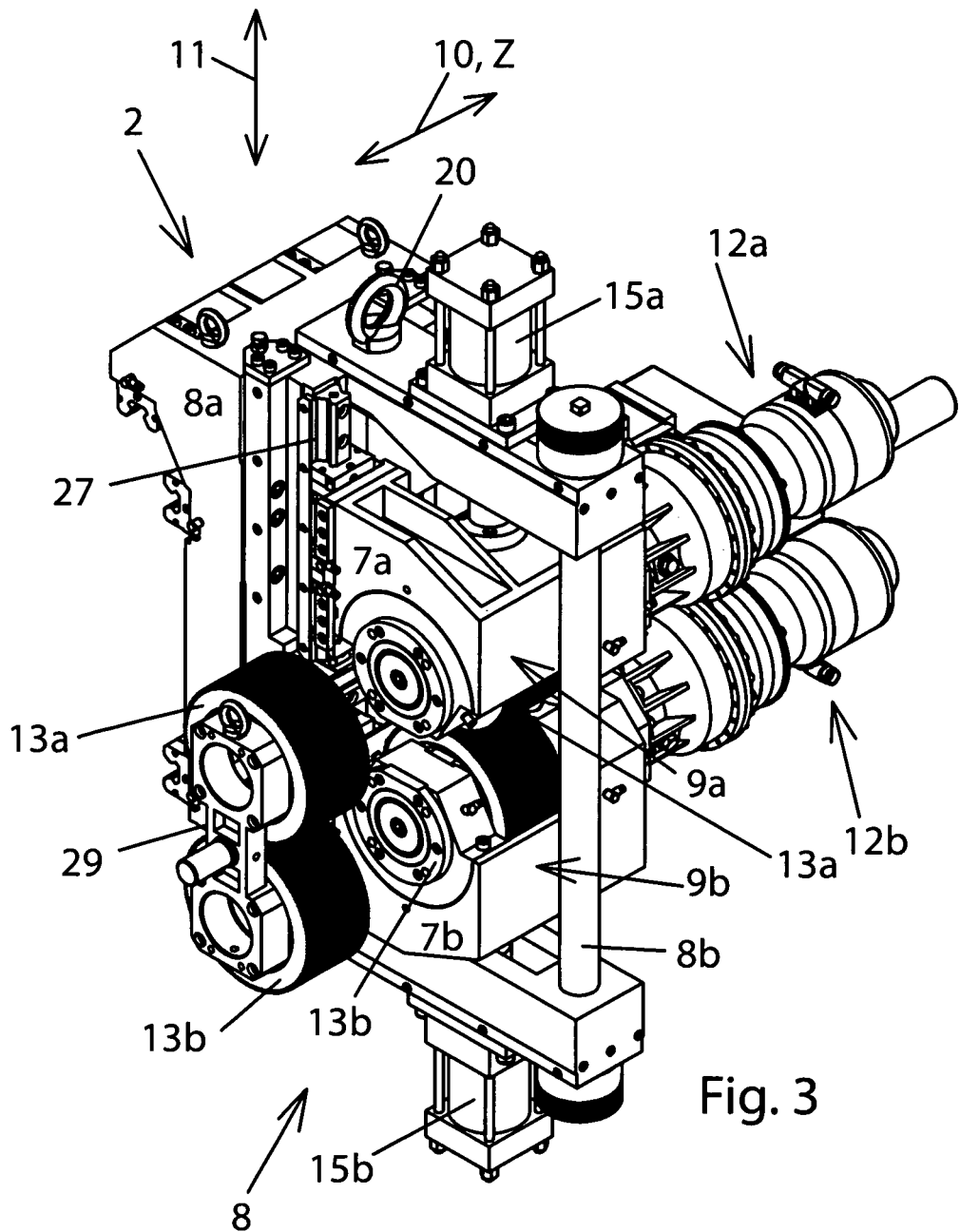
FIG. 3 illustrates the cold rolling unit in assembled condition.

FIG. 3 corresponds to the perspective view of FIG. 2a, however the forming rollers 13a, b are additionally depicted a second time shortly before/after the assembly/disassembly, wherein they are attached at an assembly yoke 15 which is removed again after assembly.

As apparent in the best way from FIGS. 2a, and 2c the base element 8 of the cold rolling unit 2 is made from a base element 8a that is C-shaped in the view of FIG. 2c, wherein the open front face of the base element is completed into a circumferentially closed base element 8 through a pull rod 8b connecting the freely terminating forward protruding arms, wherein both forming roller units 9a, b are arranged in the interior of the base element 8.

The base element 8 is moveable in Z-direction with the back side of its base component 8a through sliding inserts 25a-25c arranged at this location along the two guides 6a, b of the front side and along the most forward guide 6a, c of the top side of the bed 5, wherein the movement is provided through a pull spindle running through the pull spindle receiver 26 of the base element 8.

In FIGS. 2a and 2c also the support eyelet 20 at the top side of the base element 8 is clearly visible, wherein the support eyelet facilitates demounting the entire cold rolling unit 2 from the machine tool 1 and reattaching it at the machine tool, which also shows that the cold rolling unit can be removed for particular turning- or milling application or that it can also be retrofitted at a conventional turning or milling machine.

At the front side of the vertically extending center arm of the base component 8a an X-guide 27 is arranged which extends in a transversal direction 11 of the machine 1, wherein the two forming roller units 9a, b are moveable in X-direction, wherein the rotation axes of the forming roller units are disposed on the X-axis extending through the turning center 10.

The forming roller units 9a, b respectively include a support element 7a, b in which the sliding inserts for moving along the X-guide 27 are disposed and in which the actual rotatable forming roller unit 9a, b is disposed, wherein the forming rollers 13a are supported on both sides in the respective support element 7a, b. At the rear end, e.g. on the right side of FIG. 2b a respective drive motor 12a, b is provided at each of the forming roller units which assure the rotational driving of the forming rollers 13a, b.

When the work piece is disposed between the forming rollers 13a, b for cold rolling, the forming rollers have to be pressed with high pressure on both sides against the work piece, thus respectively towards the turning center 10 which is implemented respectively through a hydraulic cylinder 15a, b which is supported at the base component 8a and extends in X-direction and loads one of the support elements 7a, b respectively in X-direction.

The cold rolling unit 2 furthermore includes a proprietary tail stock center 14 which is visible quite well in FIG. 2b, but which is not fixated in Z-direction as evident from FIG. 2c, but moveable along a Z-guide 6c relative to the base element 8, wherein the Z-guide is arranged at the base element 8, in particular the base component 8a which is performed through a drive spindle 28.

The drive spindle is moved relative to the base element 8 in Z-direction, so that the desired length portion of the work piece 100 which is disposed between the forming rollers 13a, b can be cold rolled in spite of the tail stock center 14 contacting the freely extending end of the work piece 100.

However, when the machine tool 1 has its own tail stock or its own opposite spindle with chuck, which are to be used during cold rolling, the forming roller units 9a, b are configured, so that tail stock or the opposite spindle chuck of the machine tool can move between them far enough or move through them, so that they support the free end of the work piece 100 during cold rolling.

REFERENCE NUMERALS AND DESIGNATIONS 1 machine tool
2 cold rolling unit
3a, b tool receiver
4a, b tool units 5 machine bed
6a-d, z Z-guides
7a, b support elements
8 base element
8a base component
8b pull rod
9a, b forming roller units
10 turning center
11 transversal direction
12a, b drive motor
13a, b forming roller
14 tail stock center
15 assembly yoke
16 control
17 head stock
17' spindle
18 clamping chuck
19 tool support
20 support eyelet
21 tool revolver
22a, b tool
23a, b cover
24 cover
25a, b slide insert
26 pull spindle receiver
27 X-guide
28 drive spindle
100 workpiece

The invention claimed is:

1. A material removing machine tool (1) with a work piece (100) driven in rotation about a rotation axis (10), which machine tool comprises:
   a bed (5);
   a cold rolling unit (2) including a plurality of forming rollers (13a, b) and a base element (8) supporting the forming rollers (13a, b);
   a turning machine including a plurality of material removing tools (22a, 22b) supported thereon, said turning machine also including a tool support (19) supporting the plurality of material removing tools;
   a plurality of Z-guides (6d, 6c, 6b) on the bed for guiding movements of the tool support (19) in a direction of a Z-axis that is parallel to the rotation axis;
   a plurality of Z-guides (6c, 6b, 6a) on the bed for guiding movements of the base element (8) in a direction of a Z-axis that is parallel to the rotation axis,
   wherein some, but not all, of the plurality of Z-guides for guiding movements of the tool support (19) are the same as the plurality of Z-guides for guiding movements of the base element (8).

2. The material removing machine tool according to claim 1, wherein the work piece is mounted in a spindle (17') for rotation about the rotation axis (10), and wherein the tool support (19) is located between the cold rolling unit (2) and the spindle (17').

3. The material removing machine tool according to claim 1,
   wherein the base element (8) is moveable along the bed (5), and
   wherein at least two forming roller units (9a, b) are moveable along the base element (8) in a direction towards the rotation axis (10) and in a direction away from the rotation axis (10), and
   wherein the forming roller units are moved by hydraulic cylinders (15a, b).

4. The material removing machine tool according to claim 3, wherein the forming roller units (9a, b) each include a respective drive motor (12a, b) for a respective one of the forming rollers (13a, b), and wherein the drive motors (12a, b) are synchronized with one another.

5. The material removing machine tool according to claim 3, wherein the cold rolling unit (2) includes a tail stock center (14) which is moveable along the base element (8) of the cold rolling unit (2) along the Z axis far enough, so that the tail stock center (14) can support the work piece (100) during material removing processing.

6. The material removing machine tool according to claim 3, wherein the work piece is mounted in a work piece spindle (17') for rotation about the rotation axis (10), and wherein the machine tool (1) includes a tail stock or an opposite spindle that is located on an opposite side of the bed from the work piece spindle (17'), and wherein the forming roller units (9a, b) can be moved along the base element (8) and can be moved apart far enough in the direction (11) away from the rotation axis (10), so that the forming roller units can be moved in the direction of the Z-axis beyond a forward free end, which is configured to engage the work piece, of the tail stock center or of the opposite spindle of the machine tool (1).

7. The material removing machine tool according to claim 1, wherein the forming rollers (13a, b) are each driven by a respective drive (12a, 12b), and
   wherein the machine tool (1) includes a control (16) which receives and processes signals with respect to speed and angular position of the forming roller drives and uses the signals for controlling material removing processing of the work piece (100).

8. The material removing machine tool according to claim 7, wherein the machine tool (1) includes an automated measuring device for measuring the work piece (100), and the control (16) is configured to use measuring results of the measuring device for automatically adjusting the cold rolling unit (2).

9. The material removing machine tool according to claim 1, wherein the cold rolling unit (2) is controlled by a control (16) of the machine tool (1).

10. The material removing machine tool according to claim 1, wherein covers (23a, b, 24) are provided that are moveable and are configured to completely enclose the cold rolling unit (2).

11. The material removing machine tool according to claim 1, wherein the base element (8) is closed in an annular circumferential direction and internally supports forming roller units (9a, b) and is made from an integral one piece C-shaped base component (8a) which is moveable along the bed (5) and from a pull rod (8b) connecting the free ends of the C-shaped base component (8a).

* * * * *